(12) United States Patent
Bakalash

(10) Patent No.: US 9,805,497 B2
(45) Date of Patent: Oct. 31, 2017

(54) COLLISION-CULLING OF LINES OVER POLYGONS

(71) Applicant: Reuven Bakalash, Shdema (IL)

(72) Inventor: Reuven Bakalash, Shdema (IL)

( * ) Notice: Subject to any disclaimer, the term of this patent is extended or adjusted under 35 U.S.C. 154(b) by 0 days.

(21) Appl. No.: 14/311,299

(22) Filed: Jun. 22, 2014

(65) Prior Publication Data

US 2014/0300595 A1 Oct. 9, 2014

Related U.S. Application Data

(63) Continuation-in-part of application No. 14/173,735, filed on Feb. 5, 2014, now abandoned.

(60) Provisional application No. 61/761,062, filed on Feb. 5, 2013.

(51) Int. Cl.
    *G06T 15/06* (2011.01)
(52) U.S. Cl.
    CPC .................................... *G06T 15/06* (2013.01)
(58) Field of Classification Search
    None
    See application file for complete search history.

(56) References Cited

U.S. PATENT DOCUMENTS

2005/0116951 A1* 6/2005 Stephenson .................... 345/424
2007/0182732 A1* 8/2007 Woop et al. ................... 345/420
2008/0316216 A1* 12/2008 Bakalash et al. .............. 345/505

OTHER PUBLICATIONS

Mora et al, A New Object-Order Ray-Casting Algorithm, 2002, IEEE.*
Wei et al, A Fast Collision Detection Algorithm Suitable for Complex Virtual Environment, 2011, International Conference on Transportation, Mechanical, and Electrical Engineering (TMEE).*
Crane et al, Chapter 30, Real-Time Simulation and Rendering of 3D Fluids, GPU Gems3, 2007, NVIDIA.*

* cited by examiner

*Primary Examiner* — Kee M Tung
*Assistant Examiner* — Xin Sheng

(57) ABSTRACT

Collision-culling for early elimination of non-colliding ray segments over a group of polygons in a computer graphics system. The scene is subdivided into cells, at each cell three orthographically viewed buffers of the local scene are created, each buffer is aligned with one of the three main axes. All rays in a cell are examined vs. each of the buffers to eliminate ray segments that for certain do not collide with local polygons.

4 Claims, 13 Drawing Sheets (a)

Z orthographically visible stencil
(b)

X orthographically visible stencil
(c)

Y orthographically visible stencil
(d)

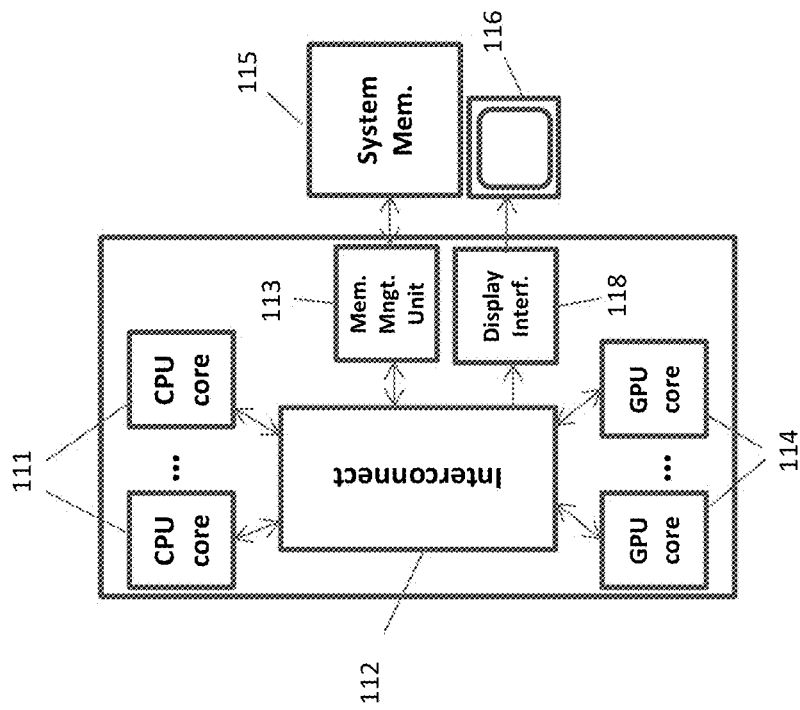
Fig. 1B. Prior art. Graphics enabled Multicore
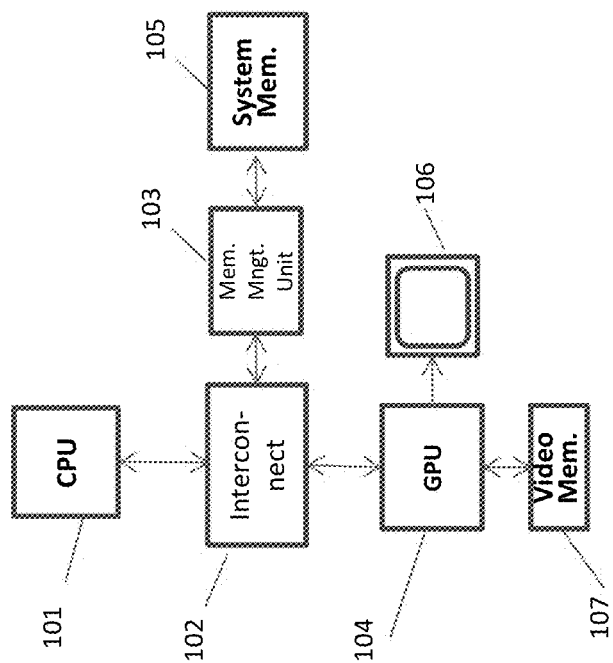
Fig. 1A. Prior art. Computer graphics system with discrete GPU

COLLISION-CULLING OF LINES OVER POLYGONS

CROSS-REFERENCE TO RELATED CASES

The present application is a Continuation-In-Part of U.S. application Ser. No. 14/173,735 filed Feb. 5, 2014 entitled "Methods and Systems for Collision-culling of Lines over Polygons", which claims priority based on U.S. Provisional Applications No. 61/761,062 filed Feb. 5, 2013 entitled "Stencil-based Adaptive Ray Bouncing"; all of which are hereby incorporated by reference.

FIELD OF THE INVENTION

Various embodiments relate generally to solving data-parallel processing and, more particularly, to detection of 3D collisions between lines and polygons in computer graphics.

BACKGROUND OF THE INVENTION

Collision detection in computer graphics typically refers to the computational problem of detecting the intersection of two or more objects. The topic is often discussed in connection with video games and other physical simulations. It has also applications in computer aided design (CAD), robotics, billiard game, nuclear physics, tracing of rays in high quality computer graphics, and other fields. While physical simulation needs to simulate real-world physics as precisely as possible, computer graphics of real time applications, such as video games, need to perform collision detection in real time and robustly. An individual subclass of collision is bouncing of rays in ray tracing, more precisely, a computational problem of detecting collision between secondary rays and scene objects.

Collision detection applications can run on variety of computing platforms, however the bouncing of ray tracing, associated with generating images, must specifically run on graphics computing system. A typical computer graphics system, with discrete graphics processing unit (GPU), is depicted in FIG. 1A. It consists of at least one CPU 101 that runs the application, and a discrete GPU 104 that generates images. They are connected by an interconnection network 102. There are two memories in the system. The system memory 105 is connected to the CPU by a memory management unit 103. The video memory 107 is connected to GPU. The display 106 is connected to GPU as well. Recently, a trend toward tighter integration between CPU and GPU has brought to the market the Multicores (termed also graphics enabled Multicores) FIG. 1B, consisting of multiple CPU cores 111 and multiple graphics cores 114, all on the same silicon chip. Such an integration on a single chip, including on silicon interconnect 112, removes the typical CPU-GPU communication bottleneck, and unifies the system memory 115 for both CPU and GPU cores. The memory management unit 113 connects the multicore to the system memory. The display interface 118 connects the display to graphics cores.

In high visual quality computer graphics, objects are represented by meshes of polygons while rays are represented by lines. Collision between a ray and a polygon can stand for (i) visibility, when a ray that is shot from a camera (primary ray) or its descendant ray (secondary ray) hits a polygon (aka object surface); or for (ii) illumination, when a polygon is hit by a ray that emits from a light source. In order to detect collision between ray and objects in the scene, a precise trajectory of the line must be calculated and intersection tests must be conducted between the ray's line and the polygons in the scene.

One problem is the high processing cost of intersection tests. For each frame, a rendering system must find the intersection points between millions of rays and millions of polygons. The cost of testing each ray against each polygon is prohibitive. A simplistic approach may create an impossible number of intersections. To reduce the number of ray/polygon intersection tests, accelerating structures are in use in the prior art, such as Octree, KD-tree, and bounding boxes. Acceleration structures are intended to reduce the amount of ray/object intersection tests by limiting the areas of tests to the ray's neighboring regions only. Nevertheless, the acceleration structure must be traversed for each ray, executing thousands of intersection tests along each ray, and typically taking 60%-70% of a frame. Moreover, construction of optimized structures is expensive and does not allow the real time frame rates that are imperative for dynamic scenes. Other weaknesses of acceleration structures stem from large memory footprints, and limited parallelism due to the centrality of the data base in a system.

As a consequence of the problems noted above, the prior art line/polygon collision detection suffers from poor performance, due to costly reconstruction and traversals of acceleration structures. Thus, there is a need in the art to devise a line/polygon collision detection method having a reduced amount of intersection tests, reduced traversals, and no or limited of reconstruction of complex acceleration structures.

SUMMARY OF INVENTION

The collision detection in some embodiments is based on partitioning the scene space into cells, without use of acceleration structures. All required data for solving the local intersection tests is provided locally, enabling an autonomous solution at each cell, independently of other cells. Instead of performing multiple intersection tests per ray, as in the prior art, on average about one intersection test per ray is performed. Moreover, rays that do not intersect objects are early filtered out, such that only positive intersections tests are executed. The result is a radical reduction in the number of intersection tests. The processing complexity is additionally reduced by solving the 3D collision detection by 2D means.

The collision detection in some embodiments of the present invention can be efficiently mapped on off-the-shelf architectures, such as Multicore chips with or without integrated GPUs, discrete GPUs having compute shaders, FPGA architectures, distributed memory parallel systems, shared memory parallel system, networks of discrete CPUs, PC-level computers, information server computers, cloud server computers, laptops, portable processing systems, tablets, Smartphones, and essentially any computer-based machine. The above mentioned computing platforms solve the collision detection by running software, so there is no necessity of special purpose hardware. However, different embodiments comprising special purpose hardware can additionally speed up the performance.

The above summary is not exhaustive. The invention includes all systems and methods that can be practiced from all suitable combinations and derivatives of its various aspects summarized above, as well as those disclosed in the detailed description below and particularly pointed out in the claims filed with the application. Such combinations have particular advantages not specifically recited in the above summary.

BRIEF DESCRIPTION OF DRAWINGS

The invention is herein described by way of non-limiting examples, with reference to the accompanying figures and drawings, wherein like designations denote like elements. Understanding that these drawings only provide information concerning typical embodiments and are not therefore to be considered limiting in scope:

FIG. 1A. Prior art. An example of a computer graphics system with discrete GPU,

FIG. 1B. Prior art. An example of a graphics enabled Multicore.

DETAILED DESCRIPTION OF THE INVENTION

Figure 2A:
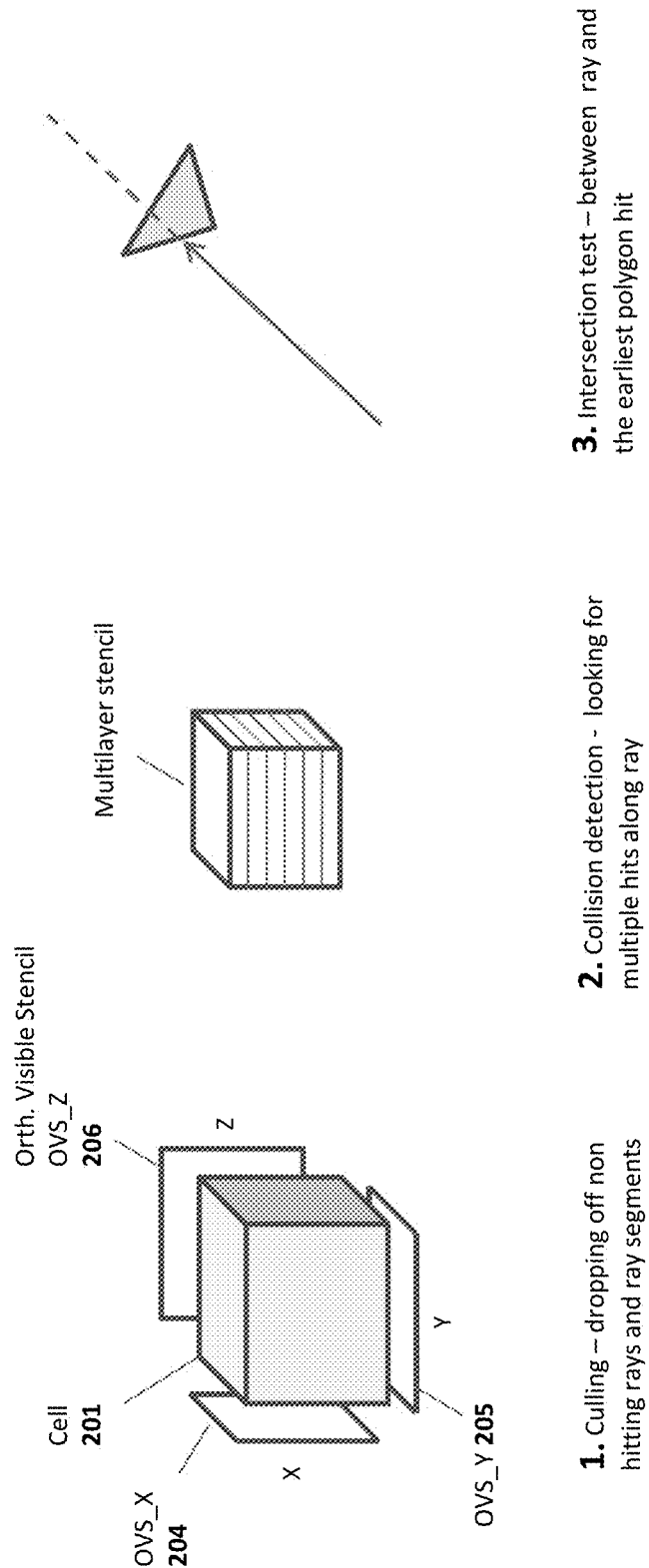
FIG. 2A. Three main stages comprising the bouncing algorithm: culling, collision detection, and intersection testing.

Unless specifically stated otherwise, as apparent from the following discussions, it is appreciated that throughout the specification discussions, utilizing terms such as "processing", "computing", "calculating", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, processing element (PE), multicore, FPGA, GPU and device (in single or plural form) for performing the operations herein. This may be specially constructed for the desired purposes, or it may contain a general purpose computer selectively activated or reconfigured by a computer program stored in the computer. Several technical terms which are specifically associated with our collision detection approach are herein defined.

Grid of cells—multiple cells, each holding a sub-scene of the partitioned scene.

Empty cell—is a cell without objects, as opposed to a data fill cell or polygon populated cell.

HIP—a hit point between ray and polygon.

Stencil—a projection of objects along with additional data. A projection creates projected areas for visible surfaces of polygons, and clear areas with no projected polygons.

Orthographic visible stencil (OVS)—a buffer of 2D raster to which cell-local polygons are orthographically rendered along a principal axis (e.g. X, Y, or Z), resulting in projected areas of visible polygons, and clear areas with no projection of polygons. OVS are created in polygon-populated cells only.

Multilayer stencil—a data structure holding depth values of all objects in a cell along a principal axis (e.g. Z axis).

Geometric model—a way to represent object data such that the surfaces of objects are defined analytically by procedural representation.

Visible object—is an object which is visible, at least in part, when looking from the point of view. It is not fully hidden by other objects.

Load balancing—distributing workload across multiple processors to achieve optimal resource utilization, maximize throughput, minimize response time, and avoid overload.

Shared memory system—parallel computing system having memory shared between all processing elements in a single address space.

Distributed memory system—parallel computing system in which each processing element has its own local address space.

Private memory—when in distributed memory systems the memory is also physically distributed, each processing element has its own private memory.

Local polygons—polygons residing wholly or partly in a cell.

Pixel record—polygon's discrete fragment stored in memory along with associated data. Ray section—a ray is intersected by cells into sections, a section per cell. Each section is processed autonomously.

Ray—ray of light, geometrically represented by a straight line.

Ray segment—a portion of ray, non relevant to cell boundaries.

Residual ray segments—remaining segments of ray that survived the complete collision-culling process.

Ray fragment—discrete primitive data of a rasterized ray.

Depth-buffer—a 2D array with one element for each pixel to which an object is rendered and the depths of its generated pixels are stored.

Compute shader—Compute Shader is a general purpose processing unit residing on modern GPUs, running programs outside of the normal rendering pipeline, such as post processing of graphics data, etc. They support virtually any type of calculation.

One objective of some embodiments of present invention is to cut down the cost of intersection tests between rays and polygons ('objects') in a distributed parallel way, minimizing the use of acceleration structures. In order to achieve data parallelism the scene is subdivided to cells, while each cell is processed autonomously. The information on cell's local polygons is stored in a set of stencils. Due to these stencils a high locality of processing and data in each cell is achieved. Moreover, a 3D problem is reduced to 2D tasks, additionally lowering the cost.

In the following discussion we refer to the case of collision detection in computer graphics, where the display time unit is frame. While in other applications, such as computer aided design (CAD), robotics and others, the time demands are much lesser, computer graphics is the most demanding application, targeting high frame rate. As mentioned above, the entire scene space is subdivided to cells; each cell contains a group of local polygons. Each polygon in a cell gets a unique ID (identification number), and all spatial values are measured locally. A ray can cross multiple cells, but at each cell only the local segment of a ray is handled. We refer to a ray as a line having a direction, and only the first intersected object counts. However, we do not exclude the case of a non-directed line in which there are multiple overlapping points with polygons, and we may need to detect more than just the first intersected point.

The methods of collision-culling and collision detection by multilayer stencil can be applied to variety of incoming objects to be processed for collision detection vs. existing group of objects. Incoming objects such as straight lines, lines of any shape, polygons, points, or of any other shape can be processed for collision with residing objects; straight lines, lines of any shape, polygons, points, or of any other shape. Nevertheless, in our discussion below we concentrate on straight lines as incoming objects representing rays, and polygons as existing objects representing scene data. Though, we do not exclude additional objects that may be incorporated in scene aside polygons, such as lines, points, solids, etc.

During the entire frame the polygon data in each cell remains steady, while the rays are temporary, incoming or locally generated, and may change multiple times during the frame. The steady polygon data is projected first into set of stencils: three orthographic visibility stencils FIG. 2A-1, and one multilayer stencil FIG. 2A-2. All the stencils are created ones per frame (in a preprocessing phase), but used repeatedly during the frame for multiple instances of rays. These stencils assist in detection of collision between rays and local polygons. The precision of collision is limited due to the discrete character of stencils. Therefore the exact hit point must be found by solving an intersection equation between the line and the polygon, FIG. 2A-3. The accurate point of intersection is termed HIP (hit point). A HIP terminates the ray, though it can serve as an origin for another ray, e.g. reflected ray, or point of birth of two rays in the case of refraction, or a terminal point in a case of a matte surface. A ray that does not collide will pass on to an adjacent cell.

Collision-culling is an early elimination of non-colliding segments of lines, by use of three orthographic visibility stencils (OVS). The set of OVS stencils is shown in FIG. 2A(1). It consist of three buffers 204, 205, 206, created in a preprocessing stage, by rendering cell's 201 local polygons into three render targets orthographically rendered along the main axes of X, Y and Z, correspondingly. Each OVS consists of an aggregated silhouette of all local polygons, visible along the axis. The use of OVS makes it possible to eliminate ray fragments that certainly do not collide. Ray fragments that survived the triple culling will undergo a collision detection.

Collision-culling. The OVS is a two-dimensional array. First, the entire scene data is partitioned into grid of cells. Then, in each cell populated by polygons, three OVS buffers are created by rendering local polygons into render targets, viewed orthographically along the three main axes, X, Y, and Z. Such an orthographic projection creates two kind of areas: covered by polygons, and clear areas with no polygons.

Figure 2B:
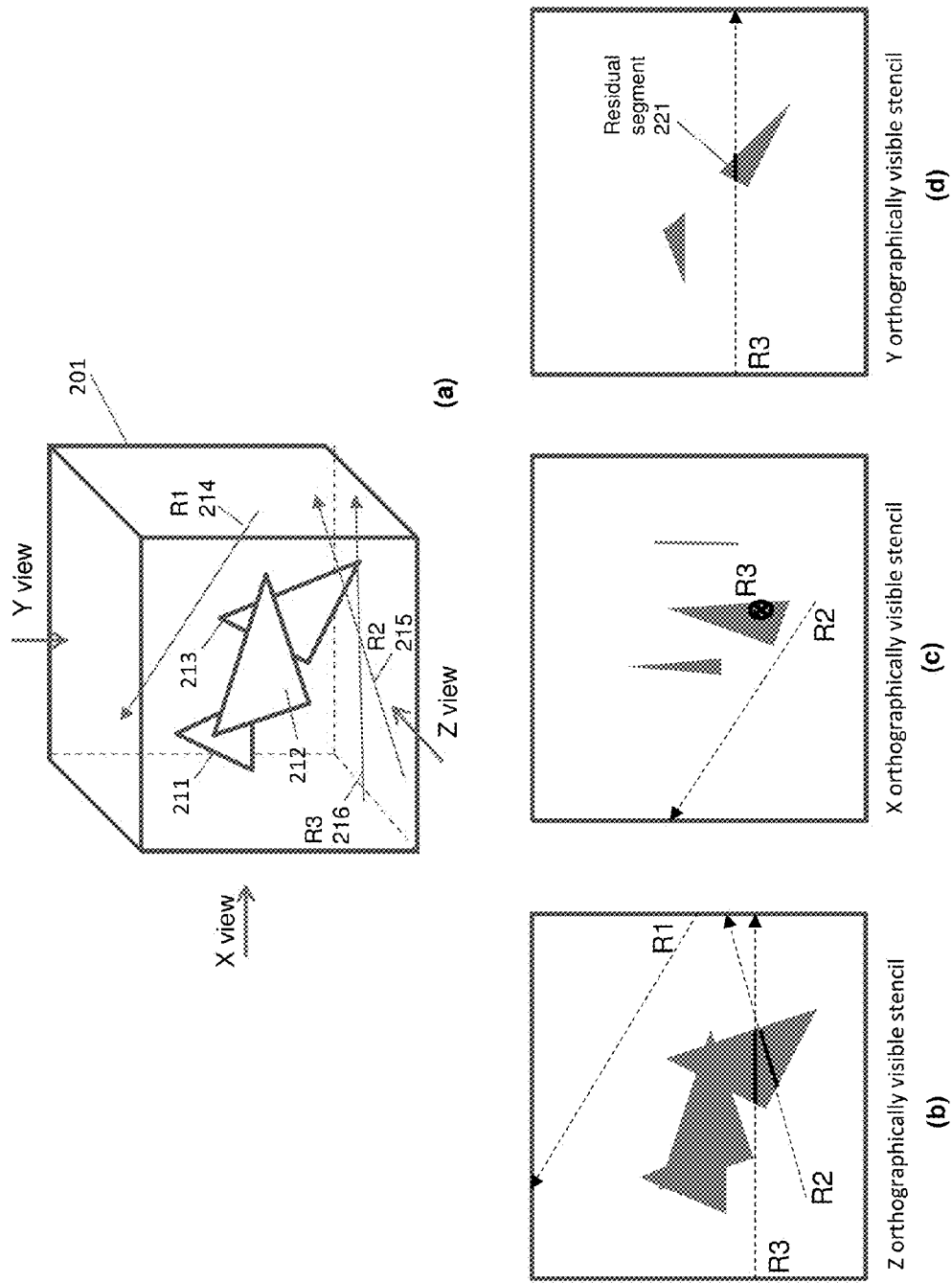
FIG. 2B. An exemplary case of 3 local polygons orthographically projected on OVS stencils, and 3 culled rays. Early elimination of non hitting rays before performing the intersection test.

FIG. 2B describes run time, upon completion of preprocessing. Each ray in the cell is initially rendered into first OVS buffer along first axis to create an orthographic projection of the ray. Ray segments (or an entire ray) that overlap with clear areas are eliminated from further processing. The remaining ray segments (not eliminated) of a ray are rendered into second OVS to create an orthographic projection of the ray along the second axis. The ray segments that overlap with clear areas are eliminated from further processing. Then the remaining ray segments are rendered into third OVS along the third axis to create an orthographic projection of the ray. Ray segments that overlap with clear areas of the third OVS are eliminated from further processing. The last remaining ray segments, called residual ray segments 221, are moved to the multilayer stencil for collision detection.

The principle of OVS is described by example in FIG. 2B. A cell 201 having local scene of three polygons is given in FIG. 2B(a). Three rays, R1 214, R2 215, and R3 216, are queried for collision with the local polygons 211, 212, 213. Three orthographic projections of the local polygons and rays are shown in FIGS. 2B (b), (c) and (d). The ray R1 in FIG. 2B (b) certainly does not collide. Therefore it is dropped from collision candidacy right at the first OVS, of Z axis. The same applies to the X OVS; R2 will be dropped because it does not overlap. R3 is the only one to survive all three stencils, but parts of it can be dropped as certainly not overlapping. Eventually only the overlapping segment 221 of R3 is set up for collision detection in the multilayer stencil.

Figure 3A:
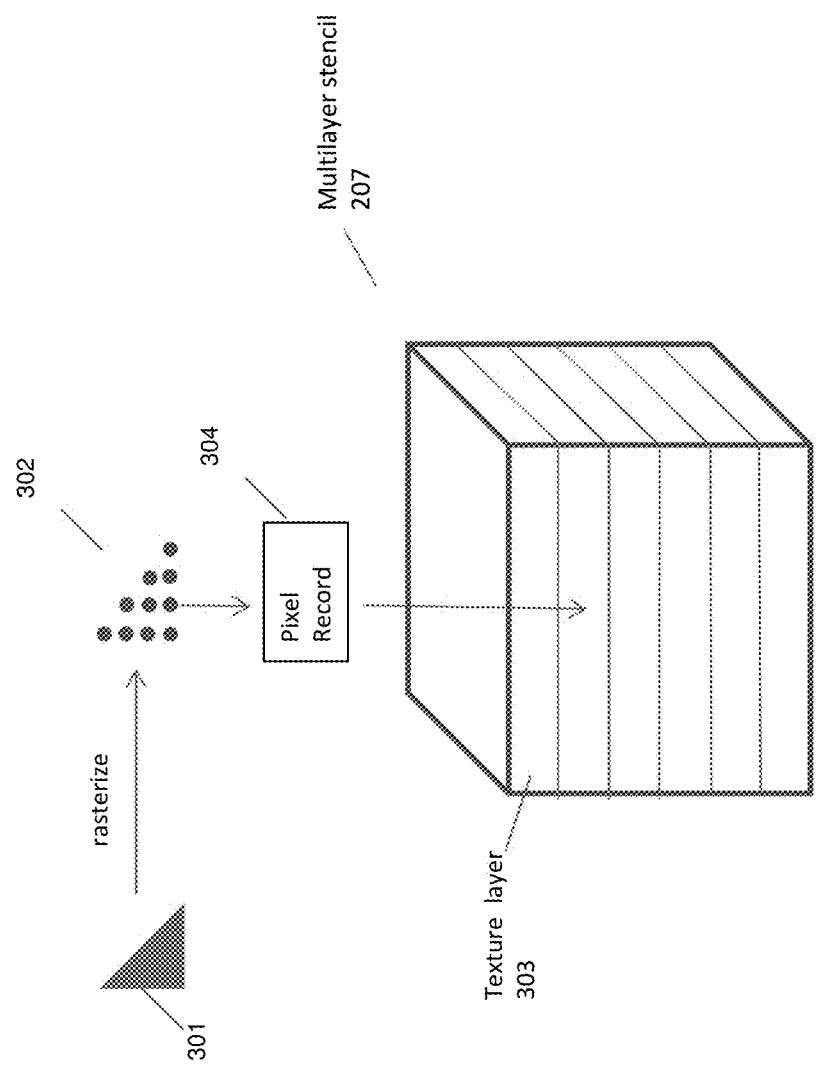
FIG. 3A. An exemplary case of rasterizing polygons and registering their depths into multilayer stencil.

Collision detection. The multilayer stencil 207 as illustrated in FIG. 3A, stores the registry of local polygons by their discrete fragments. It is generated in the preprocessing stage. Each polygon 301, is rasterized into its discrete appearing of fragments 302. E.g., a pixel record 304 comprises fragment's depth value and ID of its father polygon. Then the pixel record is stored in the multilayer stencil. The multilayer stencil is filled up by pixel records. In a GPU based implementation, the multilayer stencil can be built out of multiple texture layers 303 of texture memories. In CPU implementation, the multilayer stencil can be stored in main memory.

The following steps are taken at each cell to construct a multilayer stencil: each of local polygons is given a local ID and is rendered orthographically into depth-buffer. For each polygon fragment in the depth-buffer a pixel record is created and stored in a local multilayer stencil.

Collision detection is performed in run time, upon completion of the preprocessing stage. Each cell is processed autonomously. There may be multiple rounds of collision detection between groups of rays in a cell and local polygons. For sake of convenience, in the following discussion, we use the term 'ray' for 'ray section' as well.

The collision process occurs between incoming rays and the cell's polygon data in the multilayer stencil. Per each orthographic view, a ray undergoes first the culling process. Only rays, or ray segments, that survived the visibility stencils are likely to intersect a polygon. Though, it is possible to bypass the culling process by projecting the ray directly into depth buffer matching the coordinate setting of the multilayer stencil. In any case, a collision detection is done between the ray fragments (the residual fragments of culling, or all fragments if the culling has been bypassed) and the multilayer stencil. A collision is found when a match in depths values is detected. The exact location of hit between ray and polygon is further located by an intersection test between them, resulting in a HIP record.

Figure 3B:
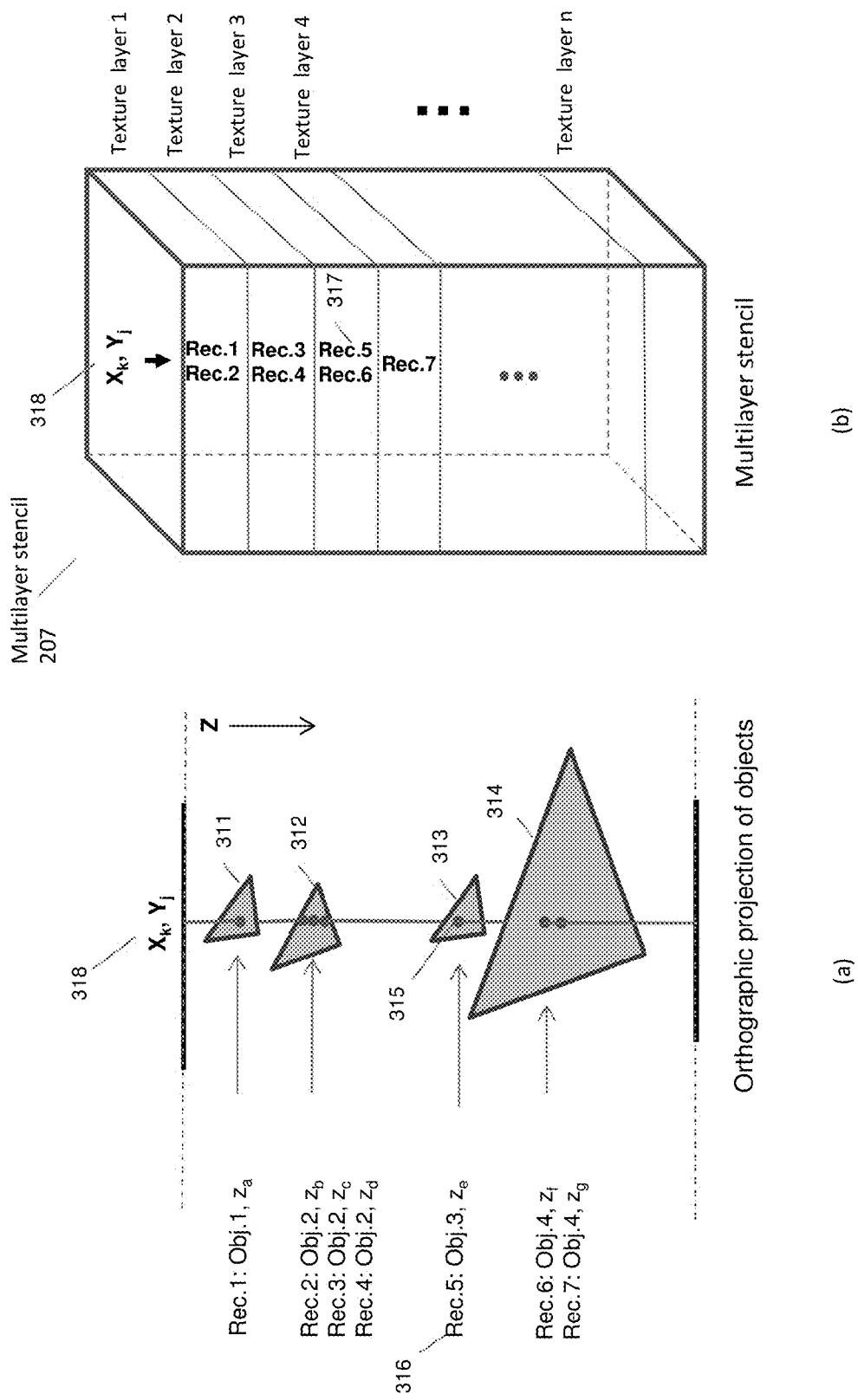
FIG. 3B. An exemplary case of construction of multilayer stencil by depth registering of local polygons.

The construction of the multilayer stencil, at the preprocessing stage, is described by an example in FIG. 3B. Four polygons 311, 312, 313, 314 populate the cell. An exemplary depth axis $X_k$, $Y_j$ 318 crosses the data at various depths is shown in (a). Fragments of four polygons at the given coordinate are shown, e.g. fragment 315 for polygon 313. A record per each fragment includes polygon's ID and fragment's depth, e.g. 316 Rec.5: Obj., $Z_e$. In one embodiment the polygon's records, associated with its fragments, are entered into an appropriate layer of the multilayer stencil 207. E.g. record 5 317 is stored in texture layer 3. In another embodiment, e.g for a GPU implementation, layer's capacity depends on the structure of texture memory. For example, assuming that the local object's ID needs 5 bits and in-cell depth value needs another 8 bits, and assuming that the capacity of an RGBa unit of texture memory is 96 bits, 7 fragments can be accommodated per level. The required amount of texture memory per X, Y coordinate depends on the number of fragments.

Figure 4:
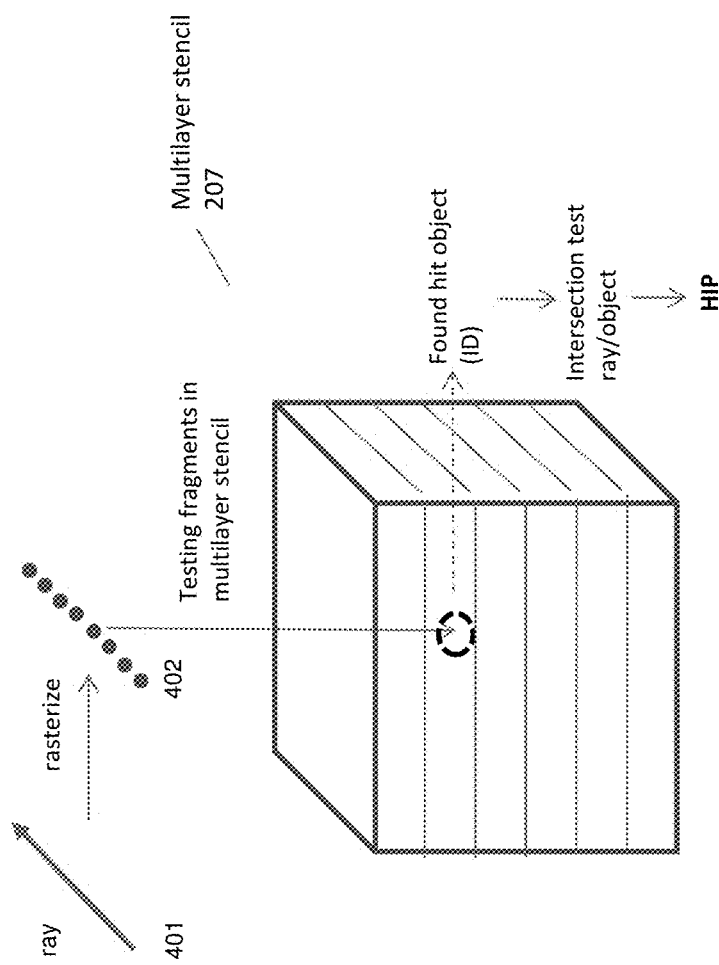
FIG. 4. An example of processing collision detection between ray line and polygons without use of OVS.

Stencils created in a cell during the preprocessing stage, are in use in run time, assisting in collision detection between rays and the local subscene. Various embodiments can be exercised in regard to the use of stencils. For example the use of VOS can be omitted, as shown in FIG. 4. It is possible in the case of a full packed cell with practically no, or almost no clear area in a cell. The ray 401 querying for collision can be rasterized and directly transferred to the multilayer stencil 207, as it, without reduction. All its fragments 402 are tested against polygon pixels in the multilayer, sequentially along the ray direction. The first hit found along the ray brings the object's ID. Though, the collision accuracy is limited by the discrete character of ray fragment and multilayer stencil. In order to get the precise location, an intersection test must be done between the geometrically defined ray and polygon. HIP (hit point) is the result of such a test.

Figure 5:
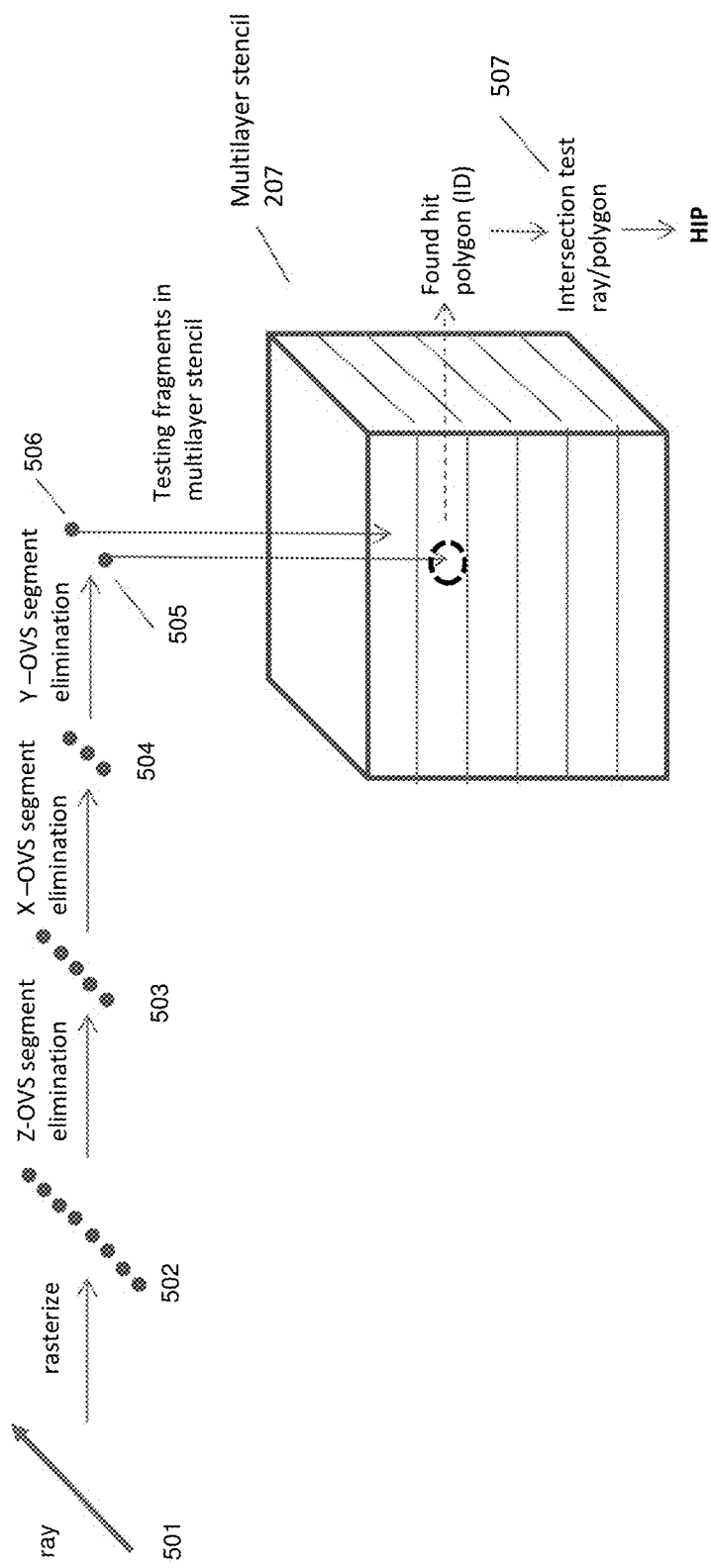
FIG. 5. An example of collision detection between a ray line and polygons, utilizing OVS. The intersection tests are of a raster accuracy.

FIG. 5 shows a different embodiment utilizing OVS. The ray 501, after being rasterized 502, undergoes a segment elimination by OVSs of Z, X and Y (503, 504 and 505 respectively). Only two residual fragments 505 and 506 are left for collision detection, saving much processing at the multilayer stencil. Once a collision is detected, the ray and the polygon are processed for intersection test 507 for accuracy.

Figure 6:
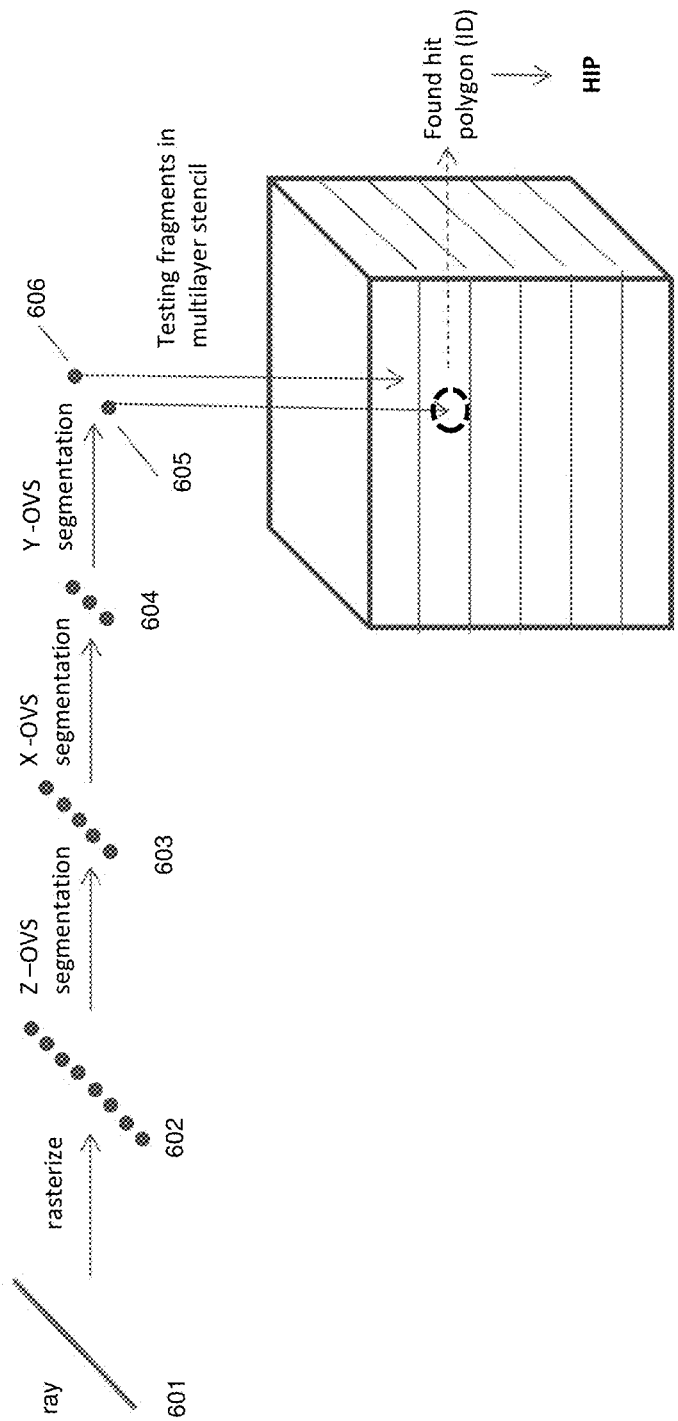
FIG. 6. An example of collision detection between a ray line and registered polygons, utilizing OVS and accurate intersection tests.

Yet another embodiment is shown in FIG. 6. It belongs to category of applications where accuracy is not necessary. The ray 601, after being rasterized 602, undergoes a segment elimination by OVSs of Z, X and Y (603, 604 and 605 respectively). Only two residual fragments 605 and 606 are left for collision detection. A collision is detected, but there is no intersection test. Since low accuracy is allowed, the geometric intersection tests are abandoned, saving time.

Figure 7A:
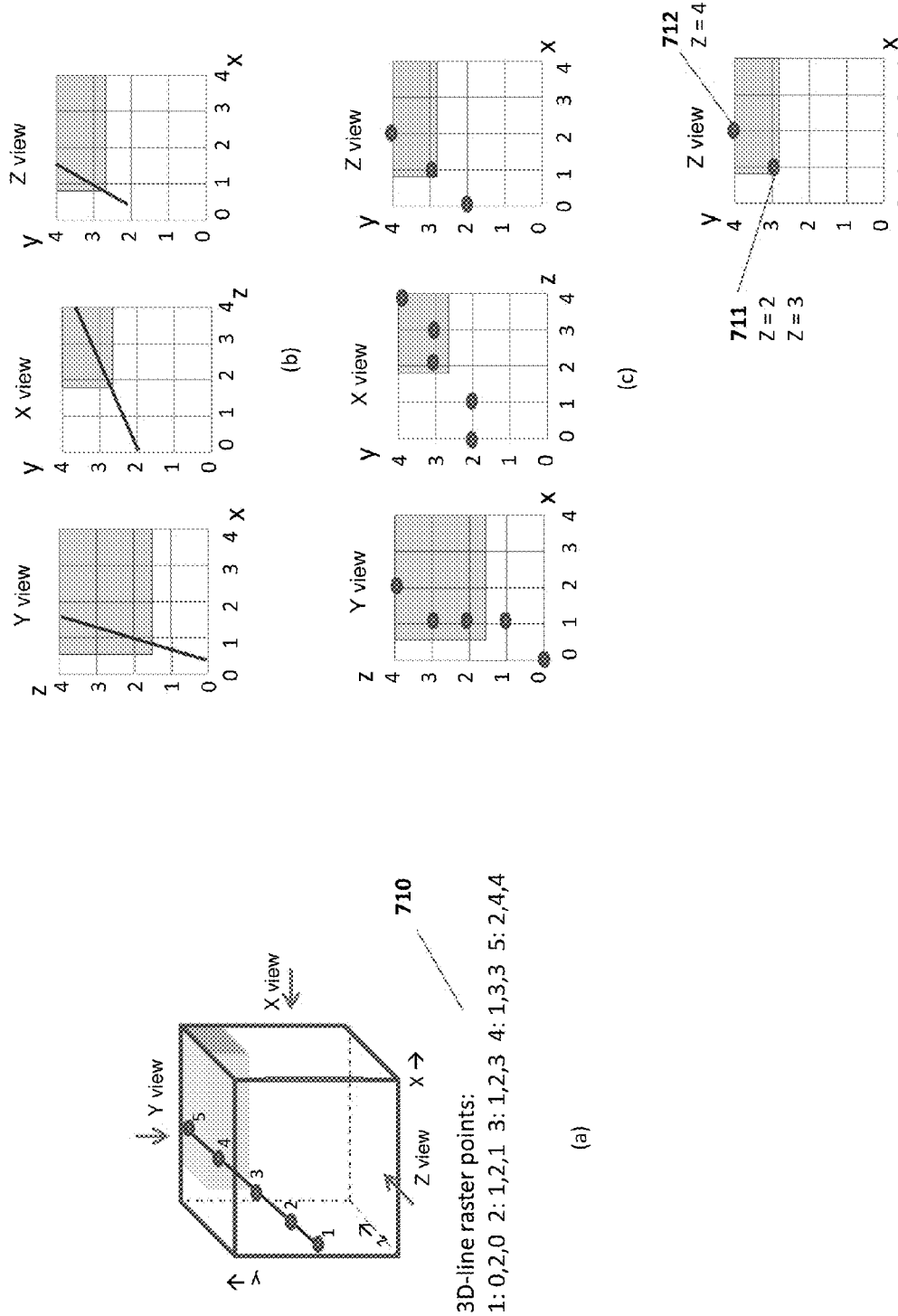
FIG. 7A. An example of collision detection between ray and group of polygons.
Figure 7B:
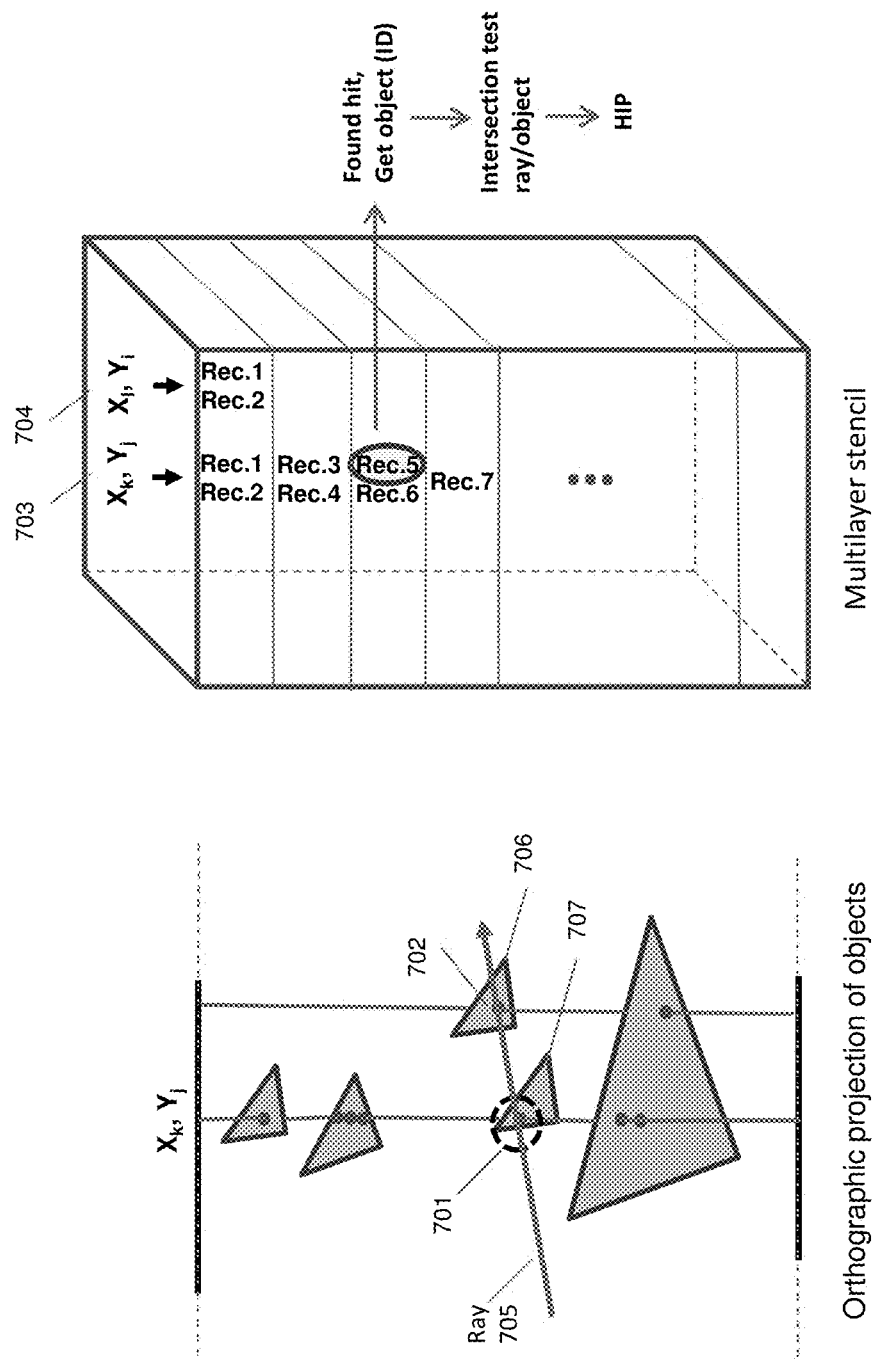
FIG. 7B. An example of collision detection between ray and group of polygons.

FIG. 7A shows an exemplary case, from 3D setting to the final result of culling, e.g. Z view, ready for comparison with the multilayer stencil. FIG. 7A-a shows a 3D setting of a cell comprising an object and one ray. The orthographic projections of the ray are shown in FIG. 7A-b. FIG. 7A-c shows three orthographic projections of the rasterized line. The 3D points of raster are shown as well 710. FIG. 7A-d is the final results of culling, the z view. The depth values are 710 and 711. Some of the rasterized points may have multiple values of depth 710.

The run time collision process between ray and polygons is demonstrated in FIG. 7B. Ray 705 passes group of polygons. The ray hits the fragments 701 and 702, belonging to two separate polygons, wherein fragment 701 is the first to collide. It is found by rasterizing the ray and comparing its fragment depths vs. the depth data in the multilayer stencil. E.g. fragment 701, whose coordinates are $X_k$, $Y_j$ and depth value $Z_e$, is depth compared with pixel records of column 703. Record 5 is found as having the same depth $Z_e$ indicating on collision at the point $X_k$, $Y_j$, $Z_e$, while the ID value in the record points out on the intersected polygon 707. The accuracy of the collision is limited to the precision of the raster. The geometrically accurate location of the hit is found by an intersection test between the ray 705 and the polygon 707. The final result is the HIP (hit point). The above described collision procedure can be done sequentially, fragment by fragment, starting from the beginning of the ray, or all fragments in parallel. In the first case the procedure stops with finding the collision of 701. In the second case, both are found simultaneously, but 702 is dropped.

The entire process of collision-culling and collision detection is iterative, meaning that after all the HIPs in a cell are found, the cell transits to a sleep mode during which new rays are being received from neighboring cells, and stored in the cell's 'input queue' in memory, toward the next iteration in a cell (a wake up of a cell). Cells are assigned to processing resources in a demand driven way. A cell can be most of the time in an inactive phase, until it is being assigned to a processing resource as part of the queuing mechanism. The same OVS and multilayer stencil serve all the iterations. During its inactive phase, the cell's input queue residing in the main memory and being accessible to other active cells, is being loaded with rays coming from neighboring cells, on top of rays that were born inside the cell. When the cell enters an active phase, driven by a processor, all rays buffered in the input queue must be tested for collision with local objects, i.e. the OVS and multilayer stencil. Rays that do not collide with local objects are calculated for hitting cell's faucet, and transferred to the input queue of neighboring cells. When an input queue gets exhausted, the processing resource is taken away for a new cell. The cell enters an inactive phase in which the input queue is getting reloaded with a new set of rays. This activity of a cell re-awakes again and again until the source of rays dries out. Throughout the entire cycle the same infrastructure of OVS and multilayer stencils remains in use.

Figure 8:
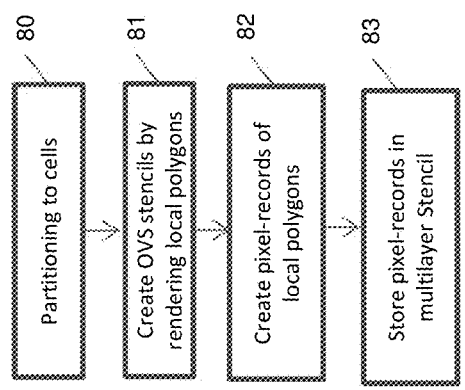
FIG. 8. An embodiment of preprocessing at cell's level.

The preprocessing stage is flowcharted in FIG. 8. First 80 the scene is partitioned into cells. Upon completing the partitioning, a generation of OVS and multilayer stencil in cells takes place. The 3 orthographic visibility stencils (OVS) are created by rendering local polygons from an orthographic point of view 81. It is done by rendering the local scene onto a Z depth buffer, X depth buffer, and finally Y depth buffer, creating the Z, X and Y OVSs respectively. Next, local polygons are rasterized, and their discrete fragments are packed up into pixel-records 82, and these pixel-records are stored in multilayer stencil 83. The multilayer stencil registers all polygons, regardless of their visibility. Polygon fragments are registered as pixels specifying the depth and the ID of its parent polygon.

Figure 9:
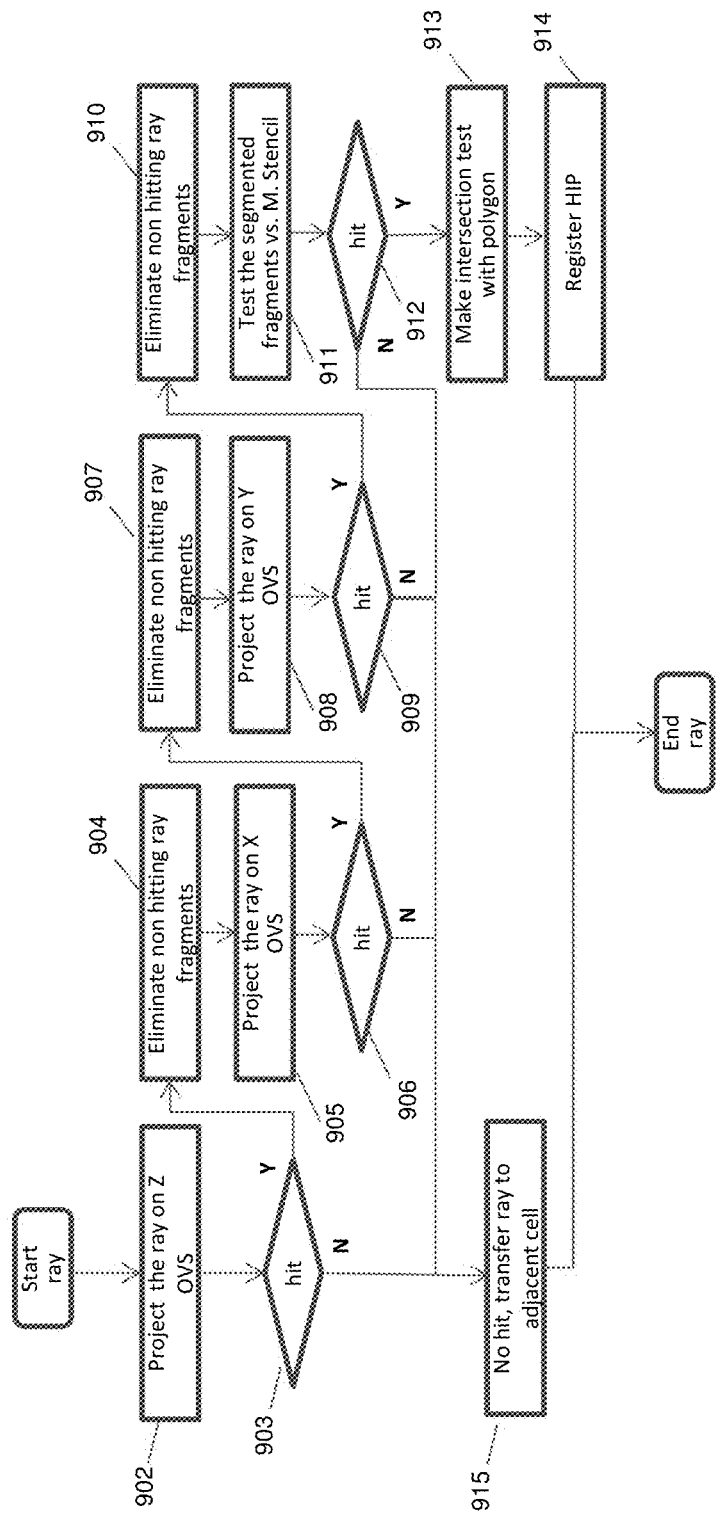
FIG. 9. A flowchart of collision detection including collision-culling.

Once the stencil infrastructure is set up, a run time starts, performing collision detection as shown in the flowchart in FIG. 9. First the original ray is projected on the Z OVS 902, and its overlapping with the depth buffer is examined 903. If the ray's projection entirely misses objects' projection it should be moved to one of neighboring cells or terminated if it reaches scene boundaries 915. Referring to FIG. 2B (b), R1 is entirely moved to 915 because it passes 'clear space only, missing the polygons' silhouettes. The remaining rays R2 and R3 are moved farther to 904, to be stripped off of their non-hitting segments, the ones that fall on clear background. After a ray is filtered-out of its non-hitting fragments 904, the reduced ray moves to the next step, to be projected on the X OVS 905. It is tested for overlapping with clear areas 905, and treated similarly to the previous OVS. Referring to FIG. 2B (c), R2 drops off, and R3 remains unchanged. Next, the ray is projected on the Y OVS 908, and tested 909. Referring to the case of FIG. 2B (d), ray R3 is stripped off of its non-hitting segments 910, and the remaining residual ray 221 goes to 911 to be tested in the Multilayer Stencil. The residual ray is now orthographically projected (z as depth axis) and its fragment depths are matched with the multilayer stencil 911. If no hit is found, the ray is dismissed via 915. If more than one hit is found, the closest hitting fragment to the origin of the ray is taken for the intersection test 913. A geometrical intersection test is carried out 913 between the ray and the polygon, gaining a high geometric precision, and the HIP is registered 914. In another embodiment, if the processing speed is of a highest importance, the discrete point of collision is taken as HIP, without performing an additional geometric intersection test.

Alternative Embodiments

Different embodiments of present invention can be efficiently implemented on a single processor system, as well as on a multiprocessor system, general purpose processors, special purpose processors, FPGA based processors, Multicore processors, and GPUs. These processors can be integrated in different computing systems such as single processor computing systems, parallel computers, PC-level computers, information server computers, cloud server computers, laptops, portable processing systems, tablets, Smartphones, and other computer-based machines. Although a single computing system is capable of performing the collision-culling and collision detection algorithms, however, parallel computing system would do it much faster and for larger data models. Today, a typical classification by model size is to small models of up to few hundreds of polygons, medium models of up to a few millions of polygons, and large models of up to billions of polygons. The multiple processors of a parallel system can share a single 'shared' memory, typically for small or medium models, when the model resides in a single memory shared by all processors. For large models the multiple processors of a parallel system would preferably have private memories, so called distributed memory parallel computing systems, when the large model is distributed among the memories, and each processor has a sole access to its private memory.

Commercial parallel systems offer the advantage of lower cost and matured programming environment. An important commercial system is Multicore. A generic structure of a Multicore, is described in FIG. 1B. The architecture of Multicore resident graphics cores are typically a reduced copy of a discrete GPU, therefore the following embodiment apply to both. The advantage of a multicore is the reduced communication cost between CPU and graphics cores because of the on-silicon interconnect. A GPU, as well as graphics cores, can be utilized either as a pipeline for raster graphics, or as a highly parallel General Purpose GPU (GPGPU), running under CUDA or OpenCL environment. The following embodiment utilizes the GPGPU approach. It is described in terms of multicore referring to FIG. 1B, but it can apply to a discrete GPU graphics system of FIG. 1A as well.

Figure 10:
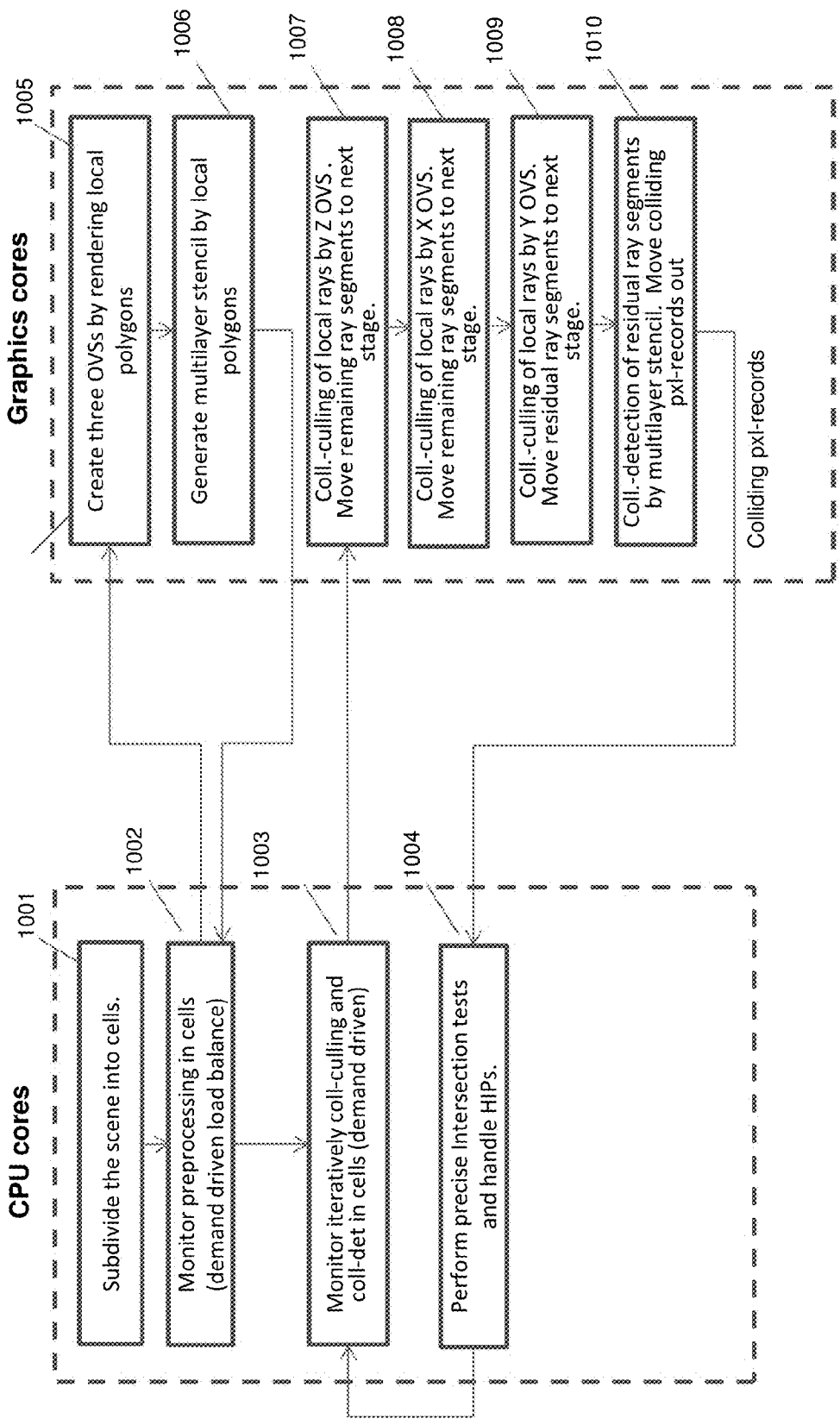
FIG. 10. An embodiment of distributed tasks between CPU and GPU cores of a multicore chip, for collision detection.

The following embodiment, as flowcharted in FIG. 10, should be seen as one of many possible embodiments. Many other embodiments utilizing collaboration between CPU and GPU, or between CPU cores and graphics cores, can be practiced, as well as those disclosed in the detailed description below and particularly pointed out in the claims filed with the application.

First, the scene is subdivided into cells 1001 by CPU cores. Then the preprocessing phase of constructing three OVS stencils for collision-culling and one multilayer stencil for collision detection is accomplished by graphics cores in all cells, monitored by CPUs. The CPUs assign graphics cores to cells in a demand driven way, keeping a dynamic load balance 1002. In each cell local polygons are rendered into depth-maps creating three OVS stencils 1005, then the polygons are rendered into fragments, and each fragment packed in a pixel-record and stored in a multilayer stencil 1006.

The runtime collision-culling and collision detection are monitored by CPUs 1003 in a demand driven way, and performed by graphics cores. First, a ray in a cell is culled by Z OVS 1007. Segments that overlap white areas are eliminated, and the remaining ray segments are moved to the next stage of X OVS 1008. Once again, the remaining ray segments are moved to the Y OVS stage 1009. The residual ray segments that survived all three culling stages are moved to the culling detection stage 1010. They are processed vs. multilayer stencil seeking for depth matching pixel-records. Colliding pixel-records are moved out to CPU cores for a ray/polygon intersection test for the precise geometric location of HIP 1004. Steps 1003-1010 repeat until all rays in a cell, for all cells are done.

What is claimed is:

1. A method to reduce collision burden by culling in 2D projections a certainly not colliding ray segments over a group of polygons in a scene of computer graphics system, comprising:

[1] sub-dividing a scene of polygon data into multiple cells, each cell holding a sub-scene;

[2] at each polygon-populated cell within the grid of cells

[2a] projecting polygon data into a first 2D projection viewed orthographically along a first axis, creating first orthographic visible stencil with projected areas and clear areas;

[2b] projecting polygon data into second 2D projection viewed orthographically along a second axis, creating second orthographic visible stencil with projected areas and clear areas;

[2c] projecting polygon data into third 2D projection viewed orthographically along a third axis, creating third orthographic visible stencil with projected areas and clear areas;

[2d] projecting each 3D ray in the cell into first projection along the first axis to create 2D orthographic projection of said ray;

[2e] culling 2D ray segments that overlap with the clear areas of the first 2D orthographic visible stencil;

[2f] projecting remaining 3D ray segments into second projection along the second axis to create 2D orthographic projection;

[2g] culling 2D ray segments that overlap with clear areas of the second 2D orthographic visible stencil;

[2h] projecting remaining 3D ray segments into the third projection along the third axis to create 2D orthographic projection;

[2i] culling 2D ray segments that overlap with clear areas of the third 2D orthographic visible stencil, whereas remaining ray segments are subject to collision tests vs. local polygons;

[3] wherein said culling reduces the amount of required collision tests in the forthcoming collision stage between rays and local polygons.

2. The method of claim 1, further in that the method implements collision-culling for early elimination of non-colliding ray segments over a group of polygons in a ray tracing system.

3. The method of claim 1, further in that the method implements collision-culling for early elimination of non-colliding ray segments over a group of polygons in a ray tracing system, and collision-culling occurs simultaneously in multiple cells.

4. The method of claim 1, wherein the method is implemented by a parallel computer system.

* * * * *